Oct. 21, 1930.                    W. J. BAKER                      1,778,928
                                 CHILD'S VEHICLE
                          Filed Nov. 8, 1928            2 Sheets-Sheet 1
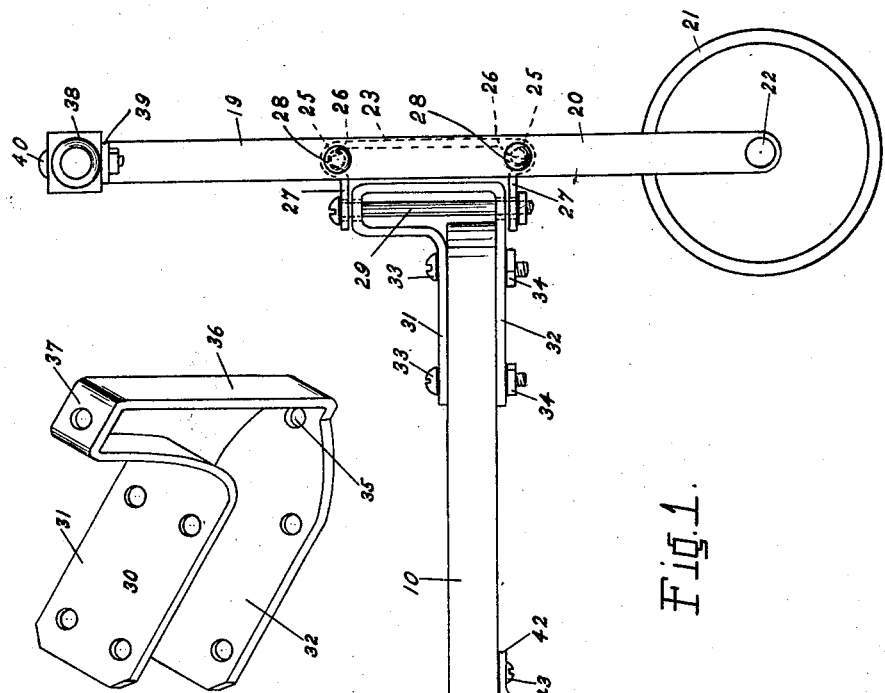
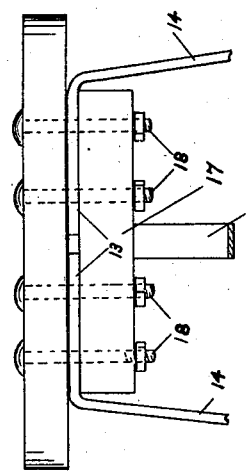
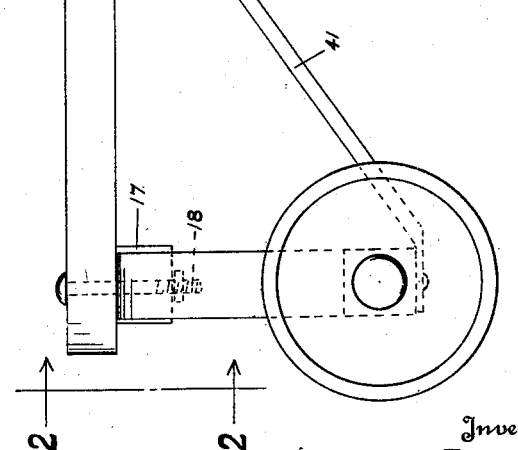
Inventor
William J. Baker
By Murray and Zugelter
Attorney Oct. 21, 1930.  W. J. BAKER  1,778,928
CHILD'S VEHICLE
Filed Nov. 8, 1928  2 Sheets-Sheet 2
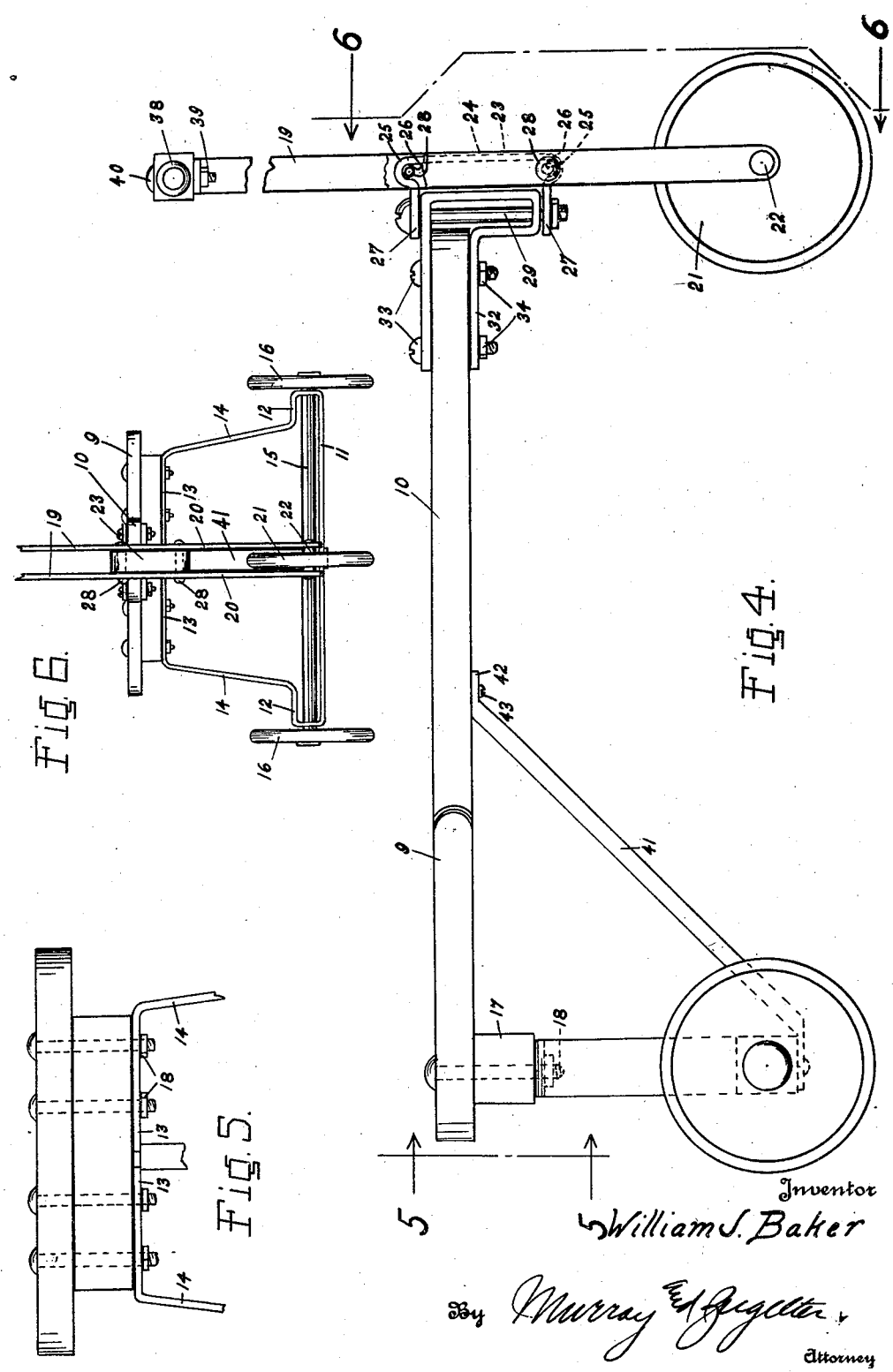
Inventor
William J. Baker
By Murray Hegeller
Attorney Patented Oct. 21, 1930

1,778,928

UNITED STATES PATENT OFFICE

WILLIAM J. BAKER, OF NEWPORT, KENTUCKY

CHILD'S VEHICLE

Application filed November 8, 1928. Serial No. 318,067.

This invention relates to a child's vehicle and has for an object the provision of means whereby to render the bed or seat thereof vertically adjustable in order to accommodate the device to a child as it grows larger.

Another object is to provide a simple and strong construction which is reversible for attaining vertical adjustment of the seat or bed member.

Another object is to provide means for the vertical adjustment of the bed of a dirigible child's vehicle.

These and other objects are attained by the means described herein and disclosed in the accompanying drawings, in which:

Fig. 1 is a side elevational view of a device embodying the invention and showing the seat or bed in a lowered position.

Fig. 2 is a view taken on line 2—2 of Fig. 1.

Fig. 3 is a perspective view of a part forming a detail of the device of the invention.

Fig. 4 is a side elevational view of a device of the invention with the seat or bed arranged in an elevated position.

Fig. 5 is a view taken on line 5—5 of Fig. 4.

Fig. 6 is a view taken on line 6—6 of Fig. 4.

The child's vehicle of the invention is herein disclosed as a three wheeled baby car with a single front wheel to be guided by means of a handle and steering post. The invention is applicable to four wheeled vehicles as well, as will be readily appreciated by those conversant with the art.

The structure comprises a bed or seat 9 having a narrow forwardly projecting tongue portion 10 which the user straddles to propel the vehicle with his feet in the well known manner. The seat may be of any approved design for the purpose. The rear tractional support for the bed comprises a formed strip of flat metal providing a frame having a lower horizontal bar 11 with inwardly turned U-shaped extensions 12. The strip metal is turned upwardly from extension 12 for an equal distance and the ends are then turned toward one another to provide a top horizontal bar portion. The upwardly turned portions 14 comprise arms which space the horizontal bars 11 and 13. The extensions 12 have aligned perforations therethrough for receiving a dead axle 15 upon which the wheels 16 are mounted. The device is shown in Figs. 1 and 2 adjusted to the use of a small child, a bed 9 resting upon the horizontal bar portion 13 and a block 17 being placed beneath the bar. The bed, bar and block have a plurality of aligned perforations therethrough for receiving fastening bolts 18 which secure them together. It will be noted that the horizontal bar 13 comprising the two inwardly turned ends is secured between the block and the seat.

The front end of the tongue 10 is supported by the steering post 19. This post is preferably formed of strip metal and comprises parallel arms 20, spaced uniformly throughout their length and providing at the lower end a fork between which the front or guide wheel 21 is mounted on a suitable axle 22. A clevis 23 is rigidly mounted between the arms 20 of the steering post 19. The clevis is simply and inexpensively formed of flat strip metal and comprises a body portion 24 with bent portions 25 at the opposite ends which provide for rounded transverse grooves 26 from the sides of which extend the spaced perforate arms 27 of the clevis. The longitudinal edges of the body and the curved portions of the clevis 23 abut adjacent faces of the spaced arms 20 of the steering post and the clevis is rigidly secured therebetween at a predetermined distance from the axle 22 by means of rivets 28. These rivets extend through perforations in the arms 20 and lie snugly in grooves 26 of the clevis. Thus the clevis and its mounting spaces the arms 20 and is rigidly bound between them against movement relative to the steering post. A king bolt 29 extends through the vertically aligned perforations in the arms 27.

A swivel bracket 30 (see Fig. 3) is adapted for reversible mounting on the forward end of the tongue 10 and is also pivotally mounted between the arms 27 on the king bolt 29. The swivel bracket is formed of a single piece of heavy sheet metal, the ends 31 and 32 being developed into a pair of perforate plates between which the tongue is received and held by removable bolts 33 and nuts 34. The plate 32 has a bore 35 for receiving the king bolt 29. A connecting body 36 extends angularly from the plate 32 for a distance substantially equal to the space between the arms 27 of the clevis and thence parallel to plate 32 for providing a perforate bearing space 37 and thence downwardly to the plate 31. Thus the bracket 30 comprises a pair of plates with one bearing surface in a plane with one of the plates and another bearing surface offset at a distance from the companion plate. By comparing the position of the swivel bracket in Figs. 1 and 4 it will be noted that the plates 31 and 32 may be disposed in either lowered or elevated positions relative to the axle 22 of steering post 19. In either position the swivel bracket provides a uniformly strong bearing between the arms 27. With plates 31 and 32 in the lowered position as shown in Fig. 1 the tongue 10 is entered between them and bolts 33 and nuts 34 are positioned to secure the tongue to the swivel bracket. The device is then in its lowered position so that a small child may readily reach the floor with its feet in order to propel the vehicle. A suitable handle bar member 38 is secured to the turned perforate ends 39 of the arms 20 by means of bolts 40.

A strip metal strut 41 is permanently attached at its one end to the lower horizontal bar 11 of the rear frame and has its opposite end 42 removably secured to the lower face of the bed or seat by means of the screw 43.

The bed or seat is capable of being elevated from the position shown in Fig. 1 to that shown in Fig. 4 without change of materials or parts and by using only the tools ordinarily found about the household. This is accomplished very freely by removing king bolt 29 and then reversing the swivel member 30 so that the offset bearing 37 extends downwardly from the bottom of the seat instead of upwardly therefrom as in Fig. 1. The rear bolts 18 are then removed and block 17 is placed on top of the upper horizontal portion 13 and the seat placed on top of the block. The bolts 18 are then replaced. Strut 41 is freed from the bed by removing the screw 43 until the changes have been made whereupon the strut will yield sufficiently to again contact the bottom of the bed where it may be again secured by inserting the screw 43.

From the foregoing it will be apparent that the device may be initially suited for a small child and, after a time, when the child would have outgrown the previously used type of vehicle of the same size, the connections may be reversed as explained so that it is converted into a similar vehicle for a larger child.

In addition to the broad feature of vertical adjustment by reversal of the parts, it will be noted that several of the members are made of substantially similar strip metal which as fabricated provides a light but very strong structure. The swivel bracket would be equally effective if made of cast metal but it would add an undesirable weight to the vehicle.

What is claimed is:

1. In a child's vehicle the combination of a bed having a top surface providing a seat, a rear tractional support for said bed, a tractionally supported steering post and a reversible member for connecting the bed and steering post at different elevations along said steering post with the top surface remaining uppermost.

2. In combination a bed, a rear tractional support, means comprising bolts and a transposable member for providing selective raised and lowered positions of the rear end of the bed on said tractional support, a front tractional support and a reversible member for attachment to the front of the bed and said front tractional support for providing vertical adjustment of the front end of the bed.

3. A child's vehicle comprising a front tractional support and a rear tractional support, a bed having a top surface providing a seat at all times and means at opposite ends of the bed for effecting vertically adjustable mounting of said bed on said tractional supports, one of said means comprising a reversible bracket member.

4. In a child's vehicle the combination of a rear tractional support, a dirigible front tractional support, a bed having a top surface providing a seat at all times, and means providing vertically adjustable attachment of the bed on said supports, one of said means comprising a reversible bracket member for supporting the front tractional support upon the bed.

5. In combination a bed, a rear tractional support, means transposable on said support for effecting raised and lowered mounting of the bed thereon, a front tractional support having fixed vertically spaced arms extending therefrom, a swivel bracket comprising a portion reversibly and pivotally mounted between the arms and having a pair of plates extending therefrom for receiving the front end of the bed therebetween whereby to provide a vertically adjustable pivotal support connection between the front tractional support and the bed.

6. In combination a steering post having vertically spaced perforate arms extending therefrom, a bed, a perforate swivel bracket receivable between the arms, a king bolt extending through the arms and the perforations of the swivel bracket, a pair of plates extending from the swivel bracket and adapted to have the bed received and secured between them.

7. In a device of the class described the combination of a steering post comprising spaced arms, a handle secured at one end of said arms, a wheel rotatably mounted between the opposite ends of said arms, a clevis comprising a substantially U-shaped member having a body with turned ends providing transverse grooves and spaced arms extending from said grooves, the body of the clevis abutting adjacent faces of said arms and serving as a spacer therefor, rivets extending through the spaced arms and lying in the transverse grooves whereby to secure the parts against relative movement and a swivel bracket pivotally mounted between the arms and adapted for receiving and supporting the vehicle bed.

8. A vertically adjustable bed mounting means for a dirigible child's vehicle comprising in combination a steering post, a pair of vertically spaced perforate arms extending therefrom, a bracket member extending between the arms, a king bolt passing through the arms and bracket for providing a pivotal mounting for said members and a bed supporting plate structure disposed adjacent one end of the bracket member, the bracket being reversible for shifting the bed supporting plate structure to different positions along the steering post.

9. In combination a bed for a child's vehicle adjustable to raised and lowered positions, a tractional support for the bed comprising a top horizontal bar for abutment upon the lower face of the bed near an end thereof, a transposable member for abutment with the top horizontal bar, securing means for clamping the horizontal bar between the bed and transposable member, said transposable member being insertible between the top horizontal bar and bed and secured by the securing means for disposing the bed in a raised position relative to the tractional support.

10. In combination a bed for a child's vehicle adjustable to raised and lowered positions, a tractional support for the bed comprising a top horizontal bar for abutment upon the lower face of the bed near an end thereof, a transposable member for abutment with the top horizontal bar, securing means for clamping the horizontal bar between the bed and transposable member, said transposable member being insertible between the top horizontal bar and bed and secured by the securing means for disposing the bed in a raised position relative to the tractional support, and means for correspondingly raising and lowering the opposite end of the bed.

In testimony whereof, I have hereunto subscribed my name this 2nd day of November, 1928.

WILLIAM J. BAKER.